(12) United States Patent
Kalhan

(10) Patent No.: US 11,051,151 B2
(45) Date of Patent: Jun. 29, 2021

(54) LAYERED DATA TRANSMISSIONS WITH GEOGRAPHICAL LOCATION DEPENDENT CONTROL INFORMATION FOR MACHINE TYPE COMMUNICATION (MTC) DEVICES

(71) Applicant: Kyocera Corporation, Kyoto (JP)

(72) Inventor: Amit Kalhan, San Diego, CA (US)

(73) Assignee: Kyocera Corporation, Kyoto (JP)

( * ) Notice: Subject to any disclaimer, the term of this patent is extended or adjusted under 35 U.S.C. 154(b) by 0 days.

(21) Appl. No.: 16/339,086

(22) PCT Filed: Oct. 4, 2017

(86) PCT No.: PCT/US2017/055042
§ 371 (c)(1),
(2) Date: Apr. 3, 2019

(87) PCT Pub. No.: WO2018/071242
PCT Pub. Date: Apr. 19, 2018

(65) Prior Publication Data
US 2019/0239046 A1    Aug. 1, 2019

Related U.S. Application Data

(60) Provisional application No. 62/406,211, filed on Oct. 10, 2016, provisional application No. 62/410,966, (Continued)

(51) Int. Cl.
*H04W 4/70* (2018.01)
*H04B 7/0413* (2017.01)
(Continued)

(52) U.S. Cl.
CPC ............ *H04W 4/70* (2018.02); *H04B 7/0413* (2013.01); *H04J 13/0003* (2013.01);
(Continued)

(58) Field of Classification Search
CPC . H04W 4/70; H04W 72/1289; H04W 72/042; H04W 84/042; H04L 1/0025;
(Continued)

(56) References Cited

U.S. PATENT DOCUMENTS

2013/0286918 A1    10/2013    Park et al.
2013/0301552 A1*   11/2013    Xu .................. H04W 72/042
                                              370/329
(Continued)

FOREIGN PATENT DOCUMENTS

WO    2016128052 A1    8/2016

OTHER PUBLICATIONS

Fujitsu; "Discussion on Control Signaling for MUST Schemes"; R1-155158, 3GPP TSG RAN WG1 Meeting #82bis, Oct. 5-9, 2015; Malmo, SE.

*Primary Examiner* — Jae Y Lee

(57) ABSTRACT

A base station transmits a transmission signal to a user equipment (UE) device and a machine type communication (MTC) device. The transmission signal includes a plurality of data subcarriers conveying UE data for the UE device where at least a portion of the data subcarriers convey at least some of the UE data on a UE data layer and convey MTC data for the MTC device on a MTC data layer. The transmission signal also includes a plurality of control subcarriers conveying geographic location dependent control information applying to reception of the data subcarriers by the UE device and by the MTC device. The control subcarriers also convey data layer control information specific to each device.

17 Claims, 9 Drawing Sheets

Related U.S. Application Data filed on Oct. 21, 2016, provisional application No. 62/412,997, filed on Oct. 26, 2016.

(51) Int. Cl.

| | |
|---|---|
| *H04L 1/00* | (2006.01) |
| *H04L 27/34* | (2006.01) |
| *H04J 13/00* | (2011.01) |
| *H04W 72/12* | (2009.01) |
| *H04W 72/04* | (2009.01) |
| *H04L 5/00* | (2006.01) |
| *H04W 84/04* | (2009.01) |

(52) U.S. Cl.
CPC .......... *H04L 1/0003* (2013.01); *H04L 1/0025* (2013.01); *H04L 1/0084* (2013.01); *H04L 27/3488* (2013.01); *H04W 72/042* (2013.01); *H04W 72/1289* (2013.01); *H04J 13/00* (2013.01); *H04L 1/0017* (2013.01); *H04L 1/0058* (2013.01); *H04L 5/0016* (2013.01); *H04L 2001/0093* (2013.01); *H04W 84/042* (2013.01)

(58) Field of Classification Search
CPC . H04L 1/0084; H04L 27/3488; H04L 1/0003; H04L 1/0017; H04L 2001/0093; H04L 5/0016; H04L 1/0058; H04J 13/0003; H04J 13/00; H04B 7/0413
See application file for complete search history.

(56) References Cited

U.S. PATENT DOCUMENTS

| | | | |
|---|---|---|---|
| 2016/0149677 A1 | 5/2016 | Morioka | |
| 2017/0265229 A1* | 9/2017 | Yang | ............... H04L 27/183 |
| 2019/0342865 A1* | 11/2019 | Shin | ............... H04L 5/0051 |

* cited by examiner

LAYERED DATA TRANSMISSIONS WITH GEOGRAPHICAL LOCATION DEPENDENT CONTROL INFORMATION FOR MACHINE TYPE COMMUNICATION (MTC) DEVICES

CLAIM OF PRIORITY

The present application claims priority to Provisional Application No. 62/406,211, entitled "SINGLE-USER MULTI-DEVICE SUPERPOSITION TRANSMISSION", filed Oct. 10, 2016, to Provisional Application No. 62/410,966, entitled "RESOURCE SHARING BETWEEN THE MTC DATA AND THE MBB DATA FOR SINGLE-USER MULTI-DEVICES SCENARIO", filed Oct. 21, 2016 and to Provisional Application No. 62/412,997, entitled "CODE DIVISION MULTIPLEXING MTC DATA WITH THE MBB DATA FOR SINGLE-USER MULTI-DEVICES SCENARIO", filed Oct. 26, 2016, all assigned to the assignee hereof and hereby expressly incorporated by reference in their entirety.

FIELD

This invention generally relates to wireless communications and more particularly to devices and methods for transmitting a signal with multiple data layers to multiple user equipment (UE) devices with common geographical location control information.

BACKGROUND

In conventional communication systems, base stations transmit signals to multiple devices within a service area where each device receives unique control information based on its specific geographical location. Some examples of control information that is dependent on the geographical location of the UE device include parameters related to multiple input multiple output (MIMO) antenna. In some situations, modulations coding scheme (MCS) parameters may also be the same.

Machine type communication (MTC) is a form of data communication which involves one or more entities that do not necessarily need human interaction. Depending on the particular implementation, an MTC device may communicate with one or more servers or with other devices. The network operator provides network connectivity to MTC server(s) regardless of whether the MTC server is controlled by the network operator. An MTC device is typically a user equipment (UE) device that is equipped for Machine Type Communication and communicates through a public land mobile network (PLMN) with MTC Server(s) and/or other MTC Device(s). In some situations, an MTC device might also communicate locally through a hardwired or wireless connection with other entities.

MTC devices are increasingly being used in a variety of applications. Examples of some of the general areas of use include security, tracking, health, payment, remote diagnostics, metering and consumer electronics. Some of the many specific applications include surveillance system control, control of physical access (e.g. to buildings), fleet management, order management, asset tracking, navigation, traffic information, road tolling, point of sales, vending machines, gaming machines, vital signs monitoring, web access telemedicine points, remote maintenance and control of sensors, lighting, pumps, valves, and elevators, vehicle diagnostics, metering of power, gas, water and heating, grid control, and management and control of digital photo frames, cameras and eBooks.

SUMMARY

A base station transmits a transmission signal to a user equipment (UE) device and a machine type communication (MTC) device. The transmission signal includes a plurality of data subcarriers conveying UE data for the UE device where at least a portion of the data subcarriers convey at least some of the UE data on a UE data layer and convey MTC data for the MTC device on a MTC data layer. The transmission signal also includes a plurality of control subcarriers conveying geographic location dependent control information applying to reception of the data subcarriers by the UE device and by the MTC device. The control subcarriers also convey data layer control information specific to each device.

DETAILED DESCRIPTION

In certain situations, multiple user equipment (UE) devices may be positioned in close proximity to each other. Such situations may occur where the multiple devices are associated with the same user and may be being used at the same time. For example, a user may be watching a video on a smartphone and listening to the associated audio stream on a headset. In the recent years more and more users use multiple devices for different purposes. For example, a user carries a smartphone, a tablet and a smartwatch and each device has wireless connectivity. All these devices independently connect to the network to perform different functions.

As the number of devices connected to the network increases the traffic-load increases as well as the management of these devices increases. In order to provide efficient wireless services to the multiple devices used by the same user there is a need to reduce the amount of spectrum-resources and control-signaling.

The techniques discussed herein take advantage of the proximity of multiple user equipment (UE) devices by transmitting a data layered signal that includes data for each of the UE devices and transmitting a common control message that comprises common geographical dependent control data that generated by the base station based on the geographical location of the UE devices. The UE devices are near enough to each other that the geographical dependent control information that applies to one of the UE devices can be applied to the other UE device(s) to successfully receive the data signal at each device. The control message also includes at least one data layer control information field for each device where the data layer control information in the field applies to a particular device and allows that device to recover the data within the data layered signal that is directed to that device. Therefore, multiple UE devices receive the same data signal and the same control message but recover only the data intended for the device. As a result, communication resources are efficiently utilized since the same time, frequency and spatial communication resources are used to transmit data to all of the UE devices while transmitting a control message that applies to all of the UE devices receiving the data signal. As discussed below, the techniques discussed may be particularly useful in applications including machine type communication (MTC). In some situations, feedback information from only one of the devices may be applied to setting transmission, modulation, coding rate, and timing parameters for the transmission. For example, feedback related to timing alignment (TA) may be received at the base station from one device and assumed to be accurate for other proximate devices receiving the transmission from the base station.

Figure 1A:
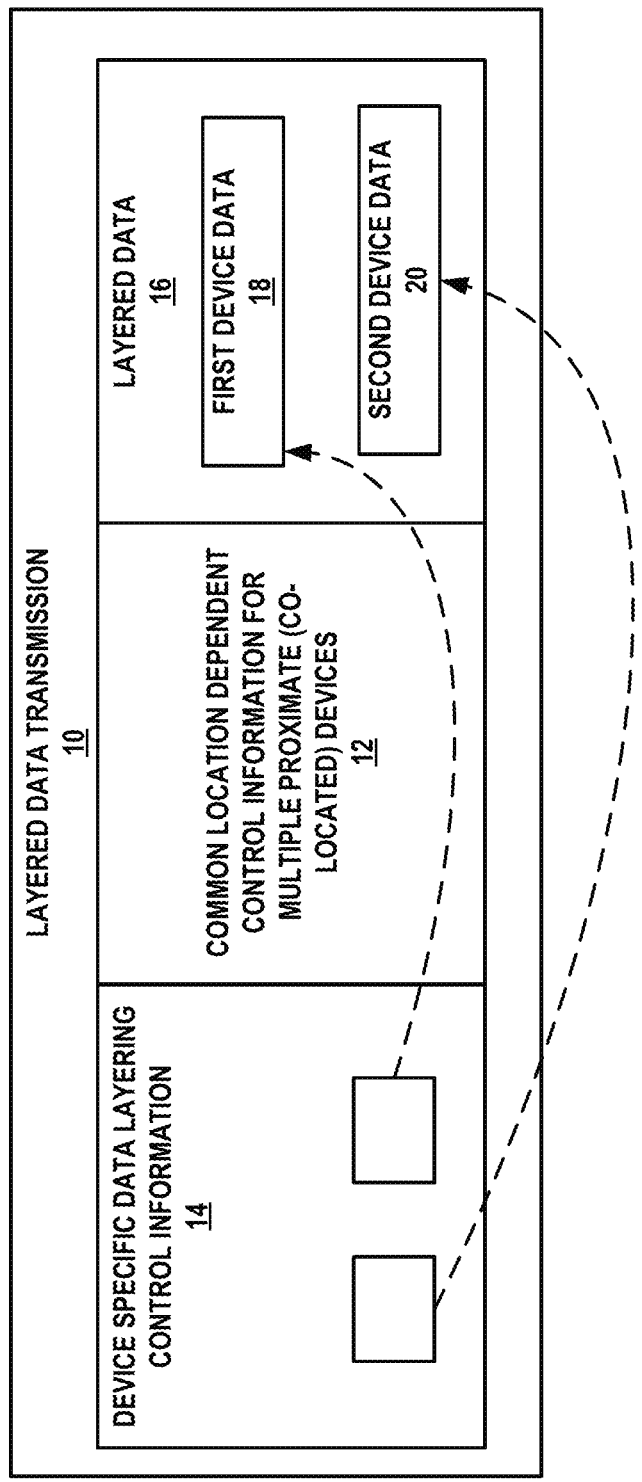
FIG. 1A is block diagram of an example of a layered data transmission 10 for multiple proximate devices.

FIG. 1A is block diagram of an example of a layered data transmission 10 for multiple proximate devices. The layered data transmission 10 shares time, frequency and spatial resources to send information to multiple devices that are located near each other. The data layered transmission includes common location dependent control information 12 that applies to multiple proximate devices and device specific data layering control information that includes information for each device regarding the data layering. The layered data 16 in the layered data transmission 10 uses the same time, frequency and spatial communication resources to convey device dependent data to each of the devices. Each device uses the common location dependent control information 12 and device dependent information in the device specific data layering control information 14 to receiver the data 18, 20 from the layer data 16 that is directed to that device. For two co-located devices, therefore, a first device applies first information in the device specific data layering control information 14 to recover first device data 18 and a second device applies second information in the device specific data layering control information 14 to recover second device data 20. The proximate devices are close enough to each such that the common control information such as spatial vectors and MIMO parameters are at least similar and, in some situations, the same. In some circumstances, the devices may be within one foot from each other. In other circumstances, the distance between the devices is less than two feet. In still other circumstances, the devices are less than three feet from each other. Other distances between the devices may also be possible depending on the particular system implementation and channel conditions.

Figure 1B:
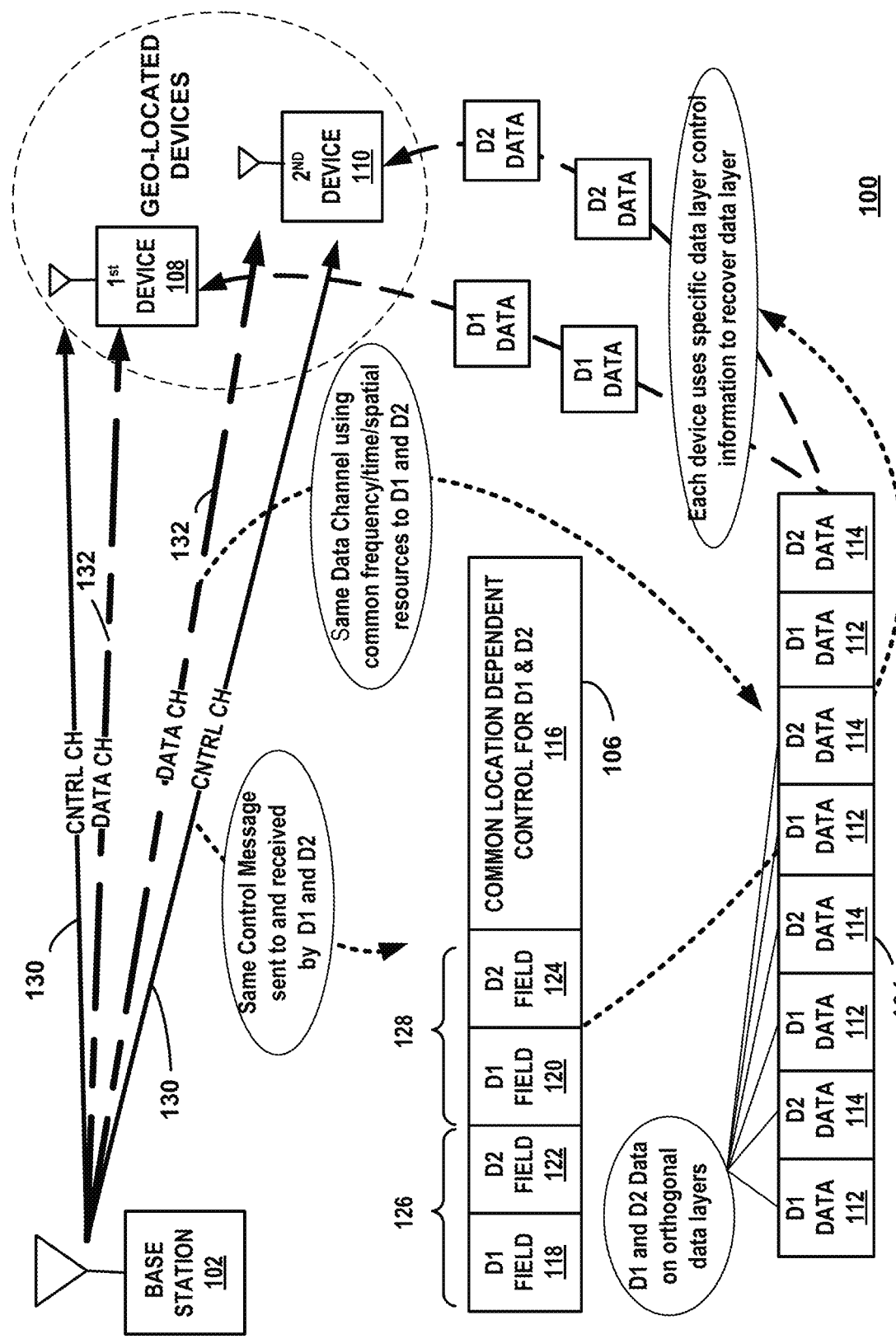
FIG. 1B is a block diagram of a communication system with a base station transmitting a layered data signal and a control message to multiple user equipment (UE) devices.

FIG. 1B is a block diagram of a communication system 100 with a base station 102 transmitting a layered data signal 104 and a control message 106 to multiple user equipment (UE) devices 108, 110. FIG. 1B is an example of a system utilizing the layered data transmission 10 of FIG. 1A to provide data to two UE devices. The control message 106 and the layered data signal 104, therefore, are an example of the layered data transmission 10. The base station 102 arranges the data on the layered data signal 104 such that first data 112 directed to the first device 108 is transmitted within a first data layer of the signal and second data 114 directed to a second device 110 is transmitted within a second data layer of the signal. Although the data layering may be applied using any of several techniques, two examples discussed herein include applying layered modulation to the data and applying code division multiplexing (CDM) to the data. The base station 102 also sends a control message 106 that includes control information regarding reception of the data layered signal 104 at the UE devices 108, 110. The control message 106 includes a common geographical location dependent control information 116 and at least one data layer information field for each device. For the example of FIG. 1B, two data layering information fields 118, 120 are assigned to the first device and two data layering information fields 122, 124 are assigned to the second device 110. The common geographical location dependent control information 116 is control information that results, or is otherwise dependent on, the location of the UE devices 108, 110. Examples of common geographical location dependent control information 106 includes MIMO settings Precoding Matrix Index (PMI), PMI Confirmation bit, Power Offset between PDSCH and RS, DM-RS Scrambling Sequence Index, Number of Layers, and Phase-tracking RS Sequence Index. As mentioned above, the control message 106 also includes data layering information 126, 128 that is arranged in data layering information fields 118, 120, 122, 124 associated with each UE device 108, 110. For the examples discussed herein, each data layer information field is directed to a particular UE device and includes information that allows the associated UE device to recover the data directed to that UE device. The data layer information fields 118, 120, 122, 124 include information related to the data layering that is used by the UE device to recover the data intended for the UE device. In situations where the data is layered using layered modulation, the data layer information fields may include modulation coding scheme (MCS), redundancy version (RV), new data indicator (NDI), and data sequence information for each data stream. Where CDM is used for the data layering, the data layering information fields may include CDM codes, for example. For the example of FIG. 1B, the control message 106 includes a first data layering information field 118 for the first device 108, a second data layering information field 120 for the first device, a first data layering information field 122 for the second device, and a second data layering information field 124 for the second device. Therefore, first data layering information 126 includes a first field 118 and a second field 122 where the first field 118 includes information for the first device 108 and the second field 122 includes information for the second device 110. Second data layering information 128 includes a first field 120 and a second field 124 where the first field 120 includes information for the first device 108 and the second field 124 includes information for the second device 110. As an example, the first data layering information 126 may be the MCS where the first field includes the MCS for the first data layer (first coding rate) for the first data directed to the first device and the second field includes the second MCS for the second data layer for the second data layer (second coding rate) directed to the second device. The second data layering information 128 may include an indication of whether the data is assigned to the LSB or the MSBs of the modulated symbols. Where CDM is used for data layering the data layering information 126 may include multiplexing codes for each device in each field. The control message 106 can include any number of data layering information parameters and fields depending on the particular situation. In addition to device specific control information regarding the data, the control message includes common control information related to the data. For example, where the time frequency resources used for the data are the same for the UE devices, the common control information related to the data may include information identifying the time-frequency resources where the data is located in the data signal.

The base station 102, therefore, transmits the control message 106 over the control channel 130 to the first UE device 108 and to the second UE device 110 and transmits the first data 112 and the second data 114 in a data layered signal 104 over the data channel 132 to the first UE device 108 and the second UE device 110. The first UE device 108 receives the control message 106 and applies the common control information 116 to the receive the data layered signal 104 and applies the data layering control information 126, 128 in the first device data layering information fields 118, 120 to recover the first data (D1 data) 112. The second UE device 110 receives the control message 106 and applies the common control information 116 to receive the data layered signal 104 and applies the data layering control information 126, 128 in the second device data layering information fields 122, 124 to recover the second data (D2 data) 114.

Figure 2:
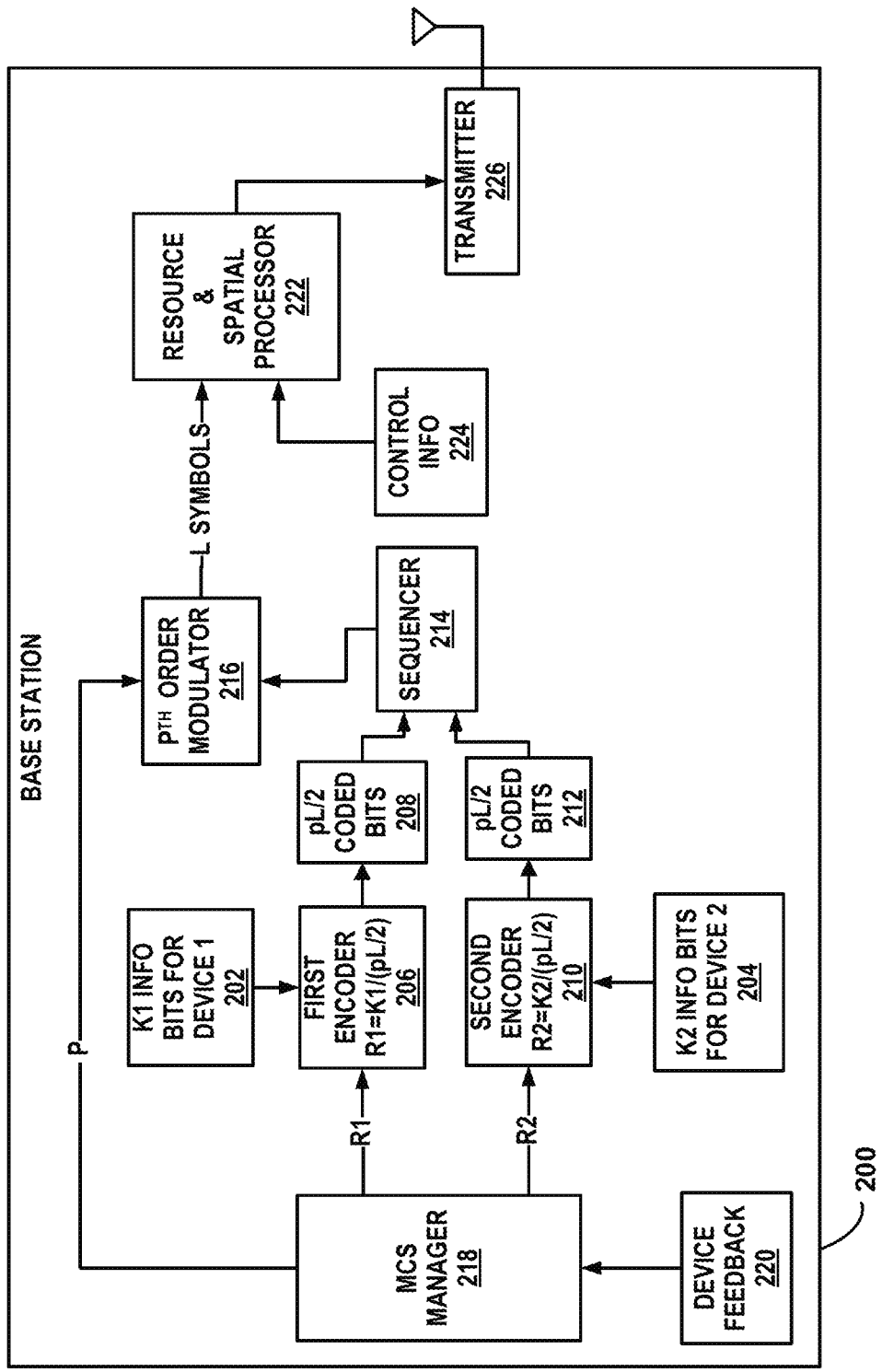
FIG. 2 is a block diagram of the base station for an example where the data layering technique includes layered modulation.

FIG. 2 is a block diagram of the base station 200 for an example where the data layering technique includes layered modulation. Accordingly, the base station 200 of FIG. 2 is an example of the base station 102 in the example of FIG. 1B. The base station 200 separately encodes the data for each device and modulates the encoded data to generate the layered modulation signal that is transmitted to both devices. For the example of FIG. 2, the base station 200 is an eNB, eNodeB, access point, or any other device performing similar tasks in a system otherwise operating in accordance with a revision of a 3GPP communication specification. The various functions and operations of the blocks described with reference to the base station 200 may be implemented in any number of devices, circuits, electronics, code, or elements. Two or more of the functional blocks may be integrated in a single device, and the functions described as performed in any single block may be implemented over several devices. For example, the functions of the two encoders 206, 210 in the base station 200 may be performed by a single device able to apply different coding rates to different sets of bits. Also, the functions of the encoders 206, 210 and sequencer 214 may be performed by a single signal processing device in some circumstances.

First data 202 intended for the first device 108 includes K1 number of information bits. Second data 204 intended for the second device 110 includes K2 number of information bits. The first data information bits 202 are coded by a first encoder 206 having a first coding rate (R1) to generate a first set of coded bits 208. The second data information bits 204 are coded by a second encoder 210 having a second coding rate (R2) to generate a second set of coded bits 212. A sequencer 214 combines the bits from the first set of coded bits 208 and from the second set of coded bits 212 in a sequence of bits that is modulated by the modulator 216. The sequence of bits includes an equal number of first coded bits 208 and second coded bits 212 in the example. The modulator 216 is a $p^{th}$ order modulator that applies layered modulation to the sequence of coded bits. A MCS manager 218 determines the coding rates and modulation order at least partially based on feedback 220 from one of the UE devices. The MCS manager 216 evaluates the required quality of service (QoS) and channel conditions to determine the appropriate modulation order and coding rates. For the example, only one of the UE devices provides feedback 220 regarding reception of signals transmitted by the base station 220. Since the UE devices 108, 110 are near each other, it is assumed that the feedback from one device is similar to feedback that would have provided by another device. In some circumstances, however, feedback 220 may be provided by multiple UE devices even though they are positioned close to each other. Examples of device feedback include parameters related to channel conditions and timing.

The L symbols generated by the modulator 216 are processed by a resource and spatial processor 222 before being transmitted by the transmitter. Control information 224 including the control message is also processed by the processor 222 before transmission. Resource mappings includes assigning timeslots and subcarriers to be used for the transmission. Spatial processing includes applying the spatial coefficients based on the MIMO parameters to the signal before transmission. For example, a beamforming vector (precoding) can be applied to the transmission signal. The control information may have the same spatial processing parameters as the transmission signal.

A transmitter 226 transmits the layered modulated signal 104 within the service area, or sector of the service area, of the base station 200. For the example, the coding rates, K1, and K2 are selected such that the number (K1) of coded bits 208 in the first set is equal to the number (K2) of coded bits 212 in the second set. If L is the total number of modulated symbols generated in the data layered signal 104, the number of coded bits in the first set of coded bits and the number of coded bits in the second set of coded bits is equal to pL/2 where p is the modulation order of the modulator 216. The coding rate of the first encoder is R1 and the coding date of the second encoder is R2 where R1=K1/(pL/2) and R2=K2/(pL/2).

For the example of FIG. 2, the layered modulation results from the sequencing of the encoded bits such that the first data 112 is represented by the most significant bits (MSB) in the modulated symbol and the second data is presented by the least significant bits (LSB) in the modulated symbol. The sequencer 214 applies the coded bits from the first encoder 206 as the most significant bits of the symbol and applies coded bits from the second encoder 210 to the least significant bits of the symbol. In some situations, the sequences of coded bits are predetermined and static. In other circumstances, however, the sequence of the bits in the transmission 112 is dynamically changing or otherwise not known by the UE devices 108, 110. As a result, the base station 200 provides the sequence to the UE devices 108, 110 as part of the control information in the control message 106. Where the sequence is known to the UE devices, the sequence information is not transmitted. For example, if the sequence includes using the most significant bits from one encoder and the least significant bits from a second encoder and the devices 108, 110 are aware of the assignment, the sequence information may not need to be transmitted to the UE devices.

Typically, a base station provides Modulation and Coding Scheme (MCS) configuration information to UE devices. For the examples herein, the base station 200 provides the MCS information for both coding rates. As a result, the base station transmits MCS1 and MCS2. The receiver decodes the control channel and accordingly demodulates/decodes the associated data streams. As discussed above with reference to FIG. 1B, the control message 106 includes common control information 116 that is dependent on the location of the UE devices and control information related to the resources used for transmitting the data and which applies to both UE devices. The control message 106 also includes specific control information related to the data layers that is unique to each UE device. For the example of FIG. 2, the control message 106 includes the MCS for the first data, the MCS for the second data, sequence information indicating LSB or MSB for the first data, sequence information indicating LSB or MSB for the second data, RV and NDI for the first data, RV and NDI for the second data, data location in the signal (which is the same for the first data and the second data), and MIMO Transmission Mode and parameters needed for spatial processing (which is the same for the first data and the second data). Additional parameter regarding the modulation layers may also be provided for each of the first data and the second data. For example, where superposition transmission techniques discussed in section 5 of 3GPP TR 36.859 v13.0.0, December 2015 are used, amplitude-weight ($\sqrt{\alpha}$) may be provided. In some situations, additional information may be provided in the control message 106. For example, the relationship between the first data and the second data may be provided. Such information may include, for example, a block number of the audio stream matching to data block number of the video stream for data buffering at each device where one device provides video to a user and the other device is providing audio.

Figure 3:
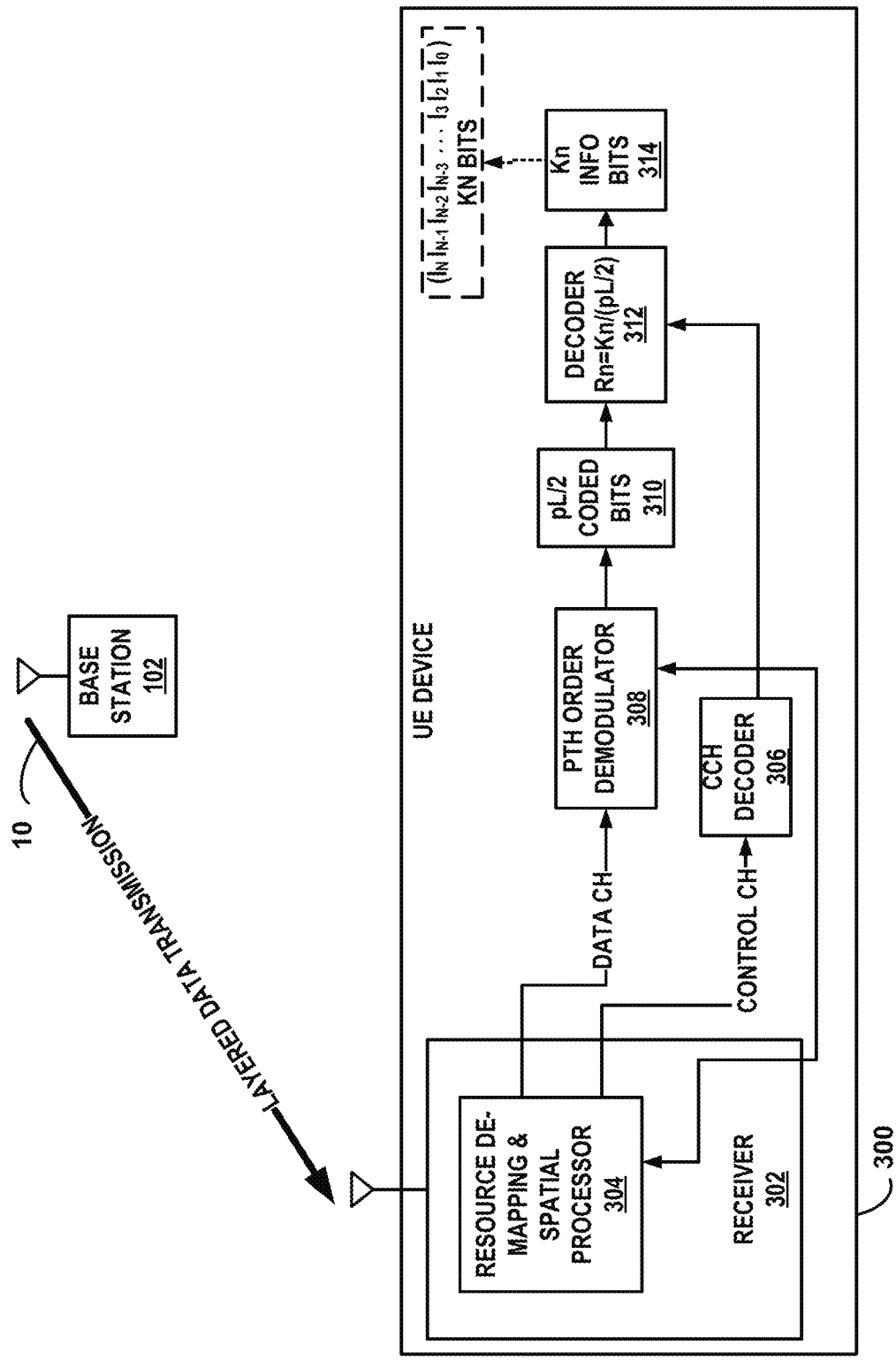
FIG. 3 is a block diagram of a UE device for an example where the layered data signal is a layered modulation signal.

FIG. 3 is a block diagram of a UE device 300 for an example where the layered data signal is a layered modulation signal. Accordingly, the UE device 300 is an example of a UE device suitable for uses as the UE device 108 and the UE device 110 for the example discussed with reference to FIG. 2. The various functions and operations of the blocks described with reference to the UE device 300 may be implemented in any number of devices, circuits, electronics, code, or elements. Two or more of the functional blocks may be integrated in a single device, and the functions described as performed in any single block may be implemented over several devices. For example, the functions of the receiver 302, the demodulator 304 as well as other spatial processing and de-mapping functions 304 may be performed by a single receiver apparatus in some circumstances.

The receiver 302 receives the data layered signal 104 from the base station 102 (200). A resource de-mapping and spatial processor 304 performs spatial processing and de-mapping. For the example, the receiver 302 applies MIMO parameters to perform spatial processing based on the control information. Resource de-mapping separates the control channel from the data channel (PDCCH and PDSCH) time/frequency resources. After decoding the PDCCH, the receiver 302 determines the exact PDSCH time/frequency resources to extract the data bits before demodulation and decoding.

The control channel information including the control message 106 is decoded by a control channel decoder 306 and the data channel portion of the signal is demodulated by the demodulator 308. The control channel decoder 206 determines the contents of the control message 106 regarding modulation order and the data layering parameters located within the data layering information fields associated with and assigned to the UE device 300. The demodulator 308 applies the modulation order parameters determined by the control channel decoder to generate the sequence of coded bits 310 that includes the coded bits 208 and the coded bits 212. In accordance with data layering information retrieved by the control channel decoder 306, the decoder 312 recovers the data directed to the UE device 300. Therefore, where the EU device 300 is the first UE device 108, the control channel decoder 306 identifies the coding rate and sequence order assigned to the first UE device 108 and the decoder 312 applies the information to recover the first data 112. Where the EU device 300 is the second UE device 110, the control channel decoder 306 identifies the coding rate and sequence order assigned to the second UE device 110 the decoder 312 applies the information to recover the second data 114.

As mentioned above, MTC devices are increasingly being used for numerous applications where the MTC devices exchange information with other devices and servers. The network facilitating communication with the MTC devices must handle the increased traffic due to the numerous MTC devices while accommodating the particular requirements and limitations of the MTC devices. At the same time, users are increasingly operating a greater number of devices where at least some of the device utilize MTC. As a result, the proximity of MTC devices associated with the same user provides an opportunity to apply the techniques discussed herein to more efficiently utilize communication resources. In addition to reducing overall consumption of resources for control information, the data layering techniques use the same time-frequency-spatial resources to service multiple devices.

Figure 4:
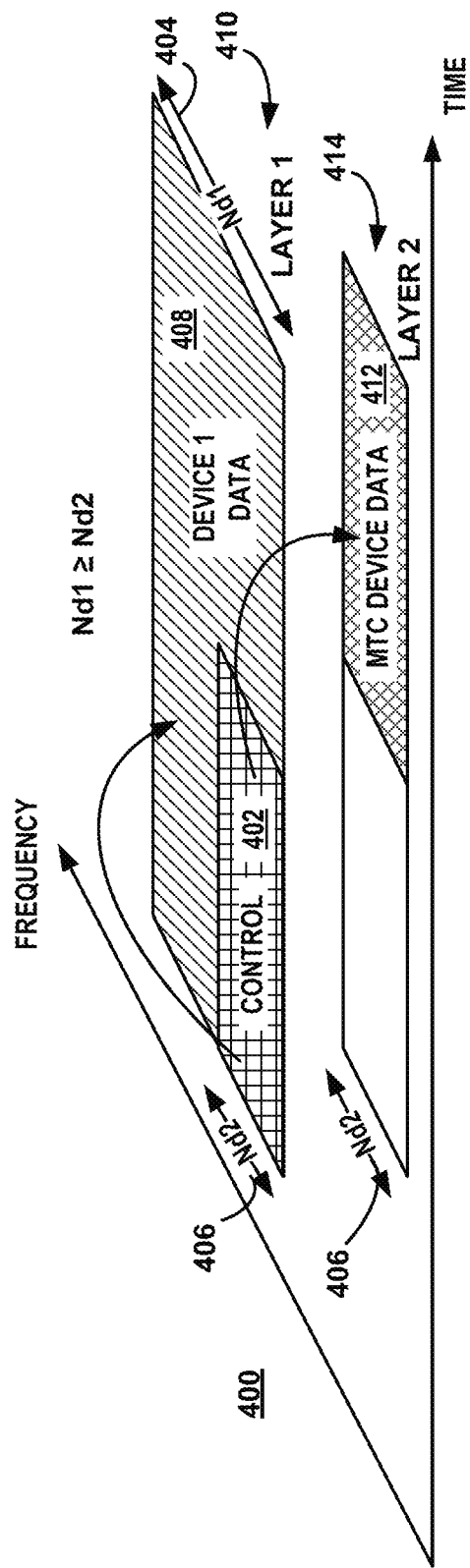
FIG. 4 is an illustration of an example of a transmission from the base station showing communication resource allocation where an MTC device is near a UE device (non-MTC device) and the layered modulation is used to layer the data.

FIG. 4 is an illustration of an example of a transmission from the base station showing communication resource allocation where an MTC device is near a UE device (non-MTC device) and the layered modulation is used to layer the data. The UE device may be a smartphone and the MTC device may be a headset where both devices are being used by a single user. Since the headset is an MTC device, it operates at a much narrower bandwidth than the smart phone and, therefore, transmits and receives signals at the narrower bandwidth. For the example, a control message 402 in the transmission 400 includes control information for the MTC device and the smartphone. The transmission utilizes a bandwidth of Nd1 404 where the information for the smartphone is distributed in the entire bandwidth Nd1 404 and information for the headset (MTC device) is only found in a narrower bandwidth Nd2 406 in a portion of the transmission. Therefore, for the example of FIG. 4, only the subcarriers in the Nd2 data region are multilayered with data for both devices. The remainder of the Nd1 subcarriers only include data for the smartphone. The smartphone (UE device) decodes the control message 402 and recovers the data 408 in the first data layer 410 that is directed to the smartphone. The headset decodes the control message 402 and recovers the data 412 in the second data layer 414 directed to the headset (MTC device).

Therefore, the base station transmits a transmission signal to the UE device and the MTC device where the two devices are close enough that at least some of the control information that is dependent on device location is the same. The transmission signal includes a plurality of data subcarriers conveying UE data for the UE device. At least a portion of the data subcarriers used for the UE data also convey MTC data for the MTC device by including UE data on a UE data layer and including MTC data for the MTC device on a MTC data layer. The transmission signal also includes a plurality of control subcarriers conveying geographic location dependent control information applying to reception of the data subcarriers by the UE device and by the MTC device. In addition to the geographic location dependent control information that applies to both devices, the control subcarriers also convey data layer control information including UE data layer control information applying to recovery of the UE data from the UE data layer and MTC data layer control information applying to recovery of the MTC data from the MTC data layer. For the example, the data layer control information is arranged different fields in the downlink control information (DCI) such that a UE field contains the UE data layer control information and a MTC field contains the MTC data layer control information. Among other data layer information, the UE data layer control information identifies time-frequency resources conveying the UE data and the MTC data layer control information identifies time-frequency resources conveying the MTC data. As discussed above, the geographic location dependent control information includes control information that applies to both devices because of their common location and may include parameters such as multiple input multiple output (MIMO) parameters and transmission mode parameters.

For the examples discussed herein, the transmission signal is transmitted in accordance with at least one revision of The Third Generation Partnership Project (3GPP) Long Term Evolution (LTE) specification such that the control subcarriers provide a Physical Downlink Control Channel (PDCCH) for conveying the geographic location dependent control information and the data layer control information. Also, an additional downlink control information (DCI) field in the PDCCH can includes an indication that MTC data is included on the least some of the subcarriers that are carrying UE data.

Since layered modulation is used for the example of FIG. 4, the data layer control information comprises a UE modulation order for the UE data layer and a MTC modulation order for the MTC data layer. Applying the techniques discussed above for the example, the information bits of UE data can be encoded with a first coding rate to generate first encoded bits and the information bits of the MTC data can be encode with a second coding rate to generate second encoded bits. The first encoded bits and the second encoded bits are then modulated by the modulator to generate a modulated signal including symbols representing both the MTC data and the UE data. The data layer control information includes the first encoding rate and the second encoding rate. Before modulation, the first encoded bits and the second encoded bits are arranged in a sequence of bits such that, when the sequence of bits is modulated, the UE data is represented with by the LSB or MSB of each modulation symbol and the MTC data is represented by the other of the LSB set or MSB set that is not being used for the UE data. The UE data layer control information then identifies whether the LSBs or the MSBs are representing UE data and the MTC data layer control information identifies whether the LSBs or the MSBs are representing the MTC data.

In some situations, the MTC data may be in a predetermined format that is known to the MTC device. As a result, the MTC data layer control information may include only limited information formation. In one example, the MTC data layer control information includes only a layered data indicator indicating that the MTC data is overlaid on a portion of data subcarriers conveying UE data. The MTC data layering information field, therefore, may include a one-bit flag that indicates whether there is layered MTC data. The predetermined format may include a modulation coding scheme (MCS), a size of the MTC data, and a time-frequency resources of the MTC data overlaid on the portion of data subcarriers. In situations the predetermined format may also include common spatial resources of the UE data and the MTC data.

Figure 5:
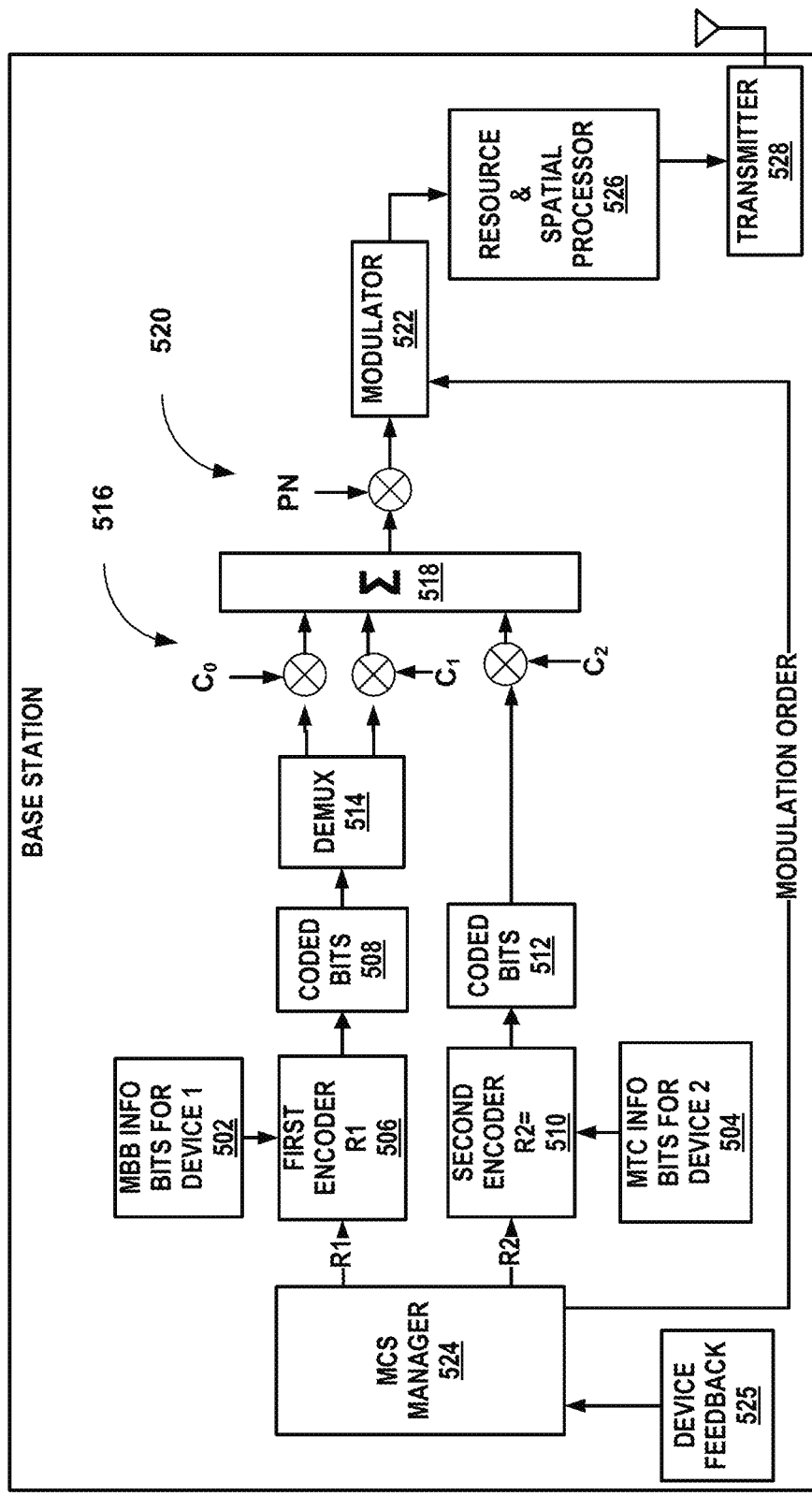
FIG. 5 is a block diagram of a base station for an example where the data layering technique includes code division multiplexing (CDM).

FIG. 5 is a block diagram of a base station 500 for an example where the data layering technique includes code division multiplexing (CDM). Accordingly, the base station 500 of FIG. 5 is an example of the base station 102 in the example of FIG. 1B. The base station 500 separately encodes the data for each device and separately modulates each set of encoded data to generate before the modulated data is code division multiplexed with orthogonal codes. The CDM signals are further processed before transmission to the devices. For the example of FIG. 5, the base station 500 is an eNB, eNodeB, access point, or any other device performing similar tasks in a system otherwise operating in accordance with a revision of a 3GPP communication specification. The various functions and operations of the blocks described with reference to the base station 500 may be implemented in any number of devices, circuits, electronics, code, or elements. Two or more of the functional blocks may be integrated in a single device, and the functions described as performed in any single block may be implemented over several devices. For example, the functions of the two encoders 506, 510 in the base station 500 may be performed by a single device able to apply different coding rates to different sets of bits.

For the example of FIG. 5, the first device is a UE device utilizing mobile broadband (MBB) and the second device is a MTC UE device. In one situation, the UE device is a smartphone and the MTC UE device is a headset as discussed above.

First data 502 intended for the first device 108 includes MBB information bits. Second data 504 intended for the second device 110 includes MTC information bits. The first MBB data information bits 502 are coded by a first encoder 506 having a first coding rate (R1) to generate a first set of coded bits 508. The MTC data information bits 504 are coded by a second encoder 510 having a second coding rate (R2) to generate a second set of coded bits 512. The first coded bits 508 are demultiplexed in a demultiplxer 514 to generate two streams where each stream is spread with a CDM code ($C_0$, $C_1$) by a code division multiplexer 516. The code division multiplexer 516 is configured to apply code division multiplexing (CDM) to the first device data and to the second device data to generate the first data layer and the second data layer. For the example, the MBB data signal is separated into two streams where one stream is spread with CDM code $C_0$ and the other is spread with code $C_1$. The MTC coded bits 512 are spread with another CDM code ($C_2$). The CDM codes ($C_0$, $C_1$, $C_2$) are orthogonal for the example. The CDM spread data streams are combined in the combiner 518 before a pseudo random (PN) sequence is applied to the combined signal by a mod 2 multiplier 520. The PN sequence (unlike the Walsh codes) is typically formed by an M-sequence. An m-sequence has excellent circular autocorrelation property where the cross-correlation of the m-sequence with any delayed version of the same m-sequence will result in a very low cross-correlation value (i.e., minimal interference). Therefore, signals meant for the first device will be much smaller when received by the second device.

A modulator 522 modulates the signal generated by the mod 2 multiplier 520 using the modulator order provided by a MCS manager 524. The MCS manager 524 determines the coding rates and modulation order at least partially based on feedback 525 from one of the UE devices. The MCS manager 524 evaluates the required quality of service (QoS) and channel conditions to determine the appropriate modulation order and coding rates. For the example, only one of the UE devices provides feedback 525 regarding reception of signals transmitted by the base station 500. Since the UE devices 108, 110 are near each other, it is assumed that the feedback from one device is similar to feedback that would have provided by another device. In some circumstances, however, feedback 525 may be provided by multiple UE devices even though they are positioned close to each other. Examples of device feedback include parameters related to channel conditions and timing.

The modulated signal is further processed by a resource and spatial processor 526. The processor 526 applies spatial processing and resource mapping. Resource mapping includes assigning timeslots and subcarriers to be used for the transmission. Spatial processing includes applying the spatial coefficients based on the MIMO parameters to the signal before transmission. For example, a beamforming vector can be applied to the transmission signal.

A transmitter 528 transmits the data layered signal 104 within the service area, or sector of the service area, of the base station 500. For the examples of FIG. 5, the control message 106 identifies the CDM codes ($C_0$, $C_1$, $C_2$) used for spreading the coded bits. Also, for the example, the transmitter 528 is an OFDM transmitter. Other types of related transmission technologies may be used to transmit the signal such as for example, Filter Bank Multicarrier (FBMC) techniques.

Typically, a base station provides Modulation and Coding Scheme (MCS) configuration information to UE devices. For the examples herein, the base station 500 provides the MCS information for both coding rates. As a result, the base station transmits MCS1 and MCS2. The receiver decodes the control channel and accordingly demodulates/decodes the associated data streams. As discussed above with reference to FIG. 1B, the control message 106 includes common control information 116 that is dependent on the location of the UE devices and control information related to the resources used for transmitting the data and which applies to both UE devices. The control message 106 also includes specific control information related to the data layers that is unique to each UE device. For the example of FIG. 5, the control message 106 includes the MCS for the first data, the MCS for the second data, RV and NDI for the first data, RV and NDI for the second data, Hybrid-HARQ parameters for the first data and Hybrid-HARQ parameters for the second data, data location in the signal (which is the same for the first data and the second data), and MIMO and Transmission Mode parameters needed for spatial processing (which is the same for the first data and the second data). In some situations, additional information may be provided in the control message 106. For example, the relationship between the first data and the second data may be provided. Such information may include, for example, a block number of the audio stream matching to data block number of the video stream for data buffering at each device where one device provides video to a user and the other device is providing audio.

Therefore, CDM data layered transmission allows a single control channel and a single resource allocation to deliver the two data streams to two devices that are in close proximity to each other. Generally, the use of CDM allows simultaneous use of the resources (spectrum) for multiple devices at the expense of reduced data rate. The extent of the data rate reduction depends on the length of the PN sequence (e.g., m-sequence). The longer the spreading code, the larger the data rate reduction while the spreading gain increases. The CDM data layering technique, however, allows the network to bias the data rate among the supported devices by allocating one or more CDM codes (e.g., Walsh codes) to specific devices based on application or device type. In particular, depending on the required data rate for each of the devices, the network may vary the number of CDM codes assigned to one device relative to another device. For the example of FIG. 5, the first device (MBB device) is allocated two CDM codes ($C_0$ and $C_1$) while the second device (MTC device) 110 is provided with one CDM code (C2) since the second device 110 requires a relatively lower data rate than first device 108. The receiver of the first device combines the data from the two data streams coded with $C_0$ and $C_1$. The code lengths of all of the codes are same for the example.

Figure 6:
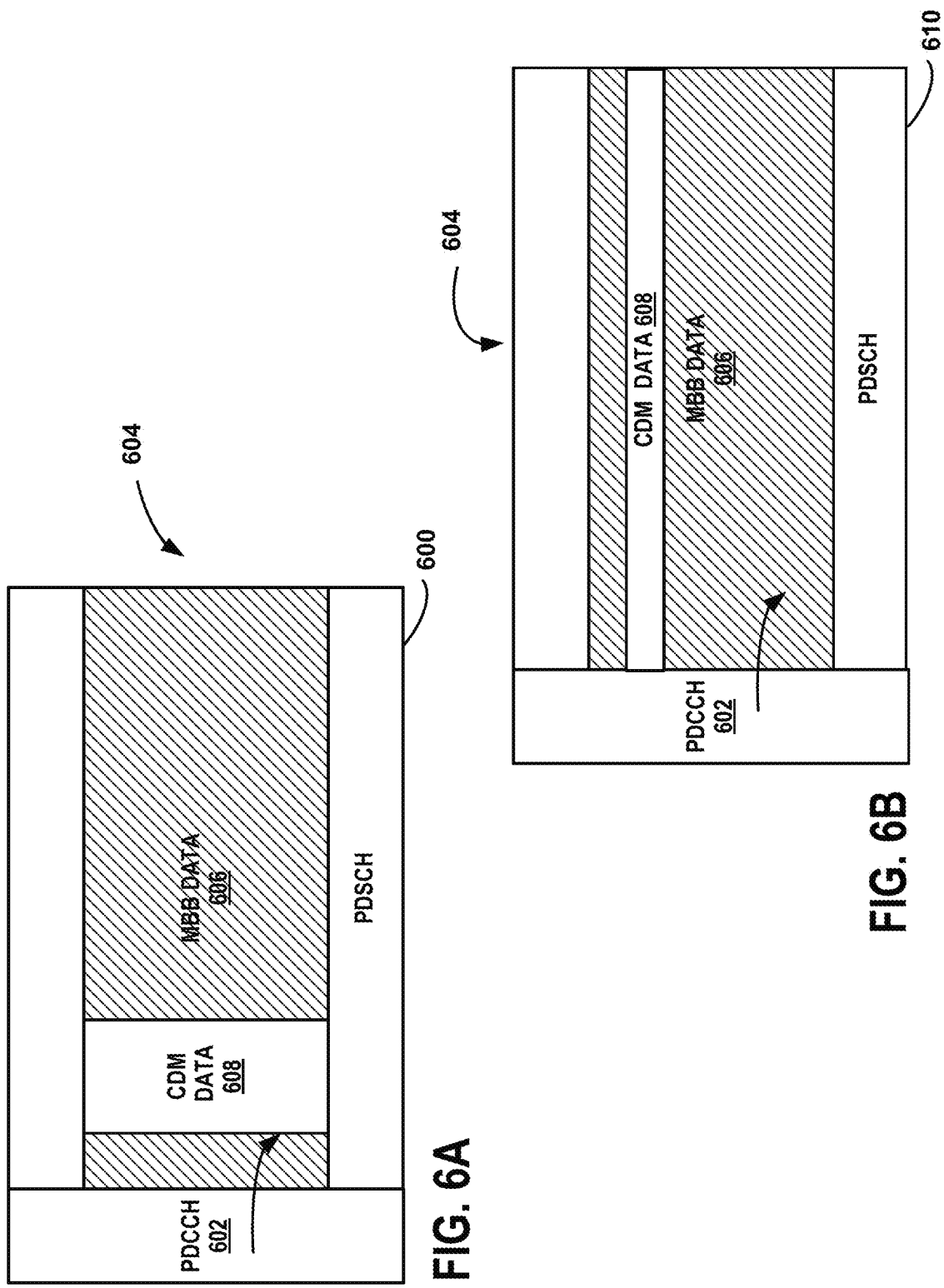
FIG. 6A is a block diagram of the data layered signal using CDM where the MTC data is overlaid on the MBB data using time division multiplexing (TDM).
FIG. 6B block diagram of the data layered signal using CDM where the MTC data is overlaid on the MBB data using frequency division multiplexing (FDM).

The MTC data symbols are overlaid on the MBB data using either time division multiplexing (TDM) or frequency division multiplexing (FDM). FIG. 6A is a block diagram of the data layered signal 600 using CDM where the MTC data is overlaid on the MBB data using time division multiplexing (TDM). Accordingly, the transmission of FIG. 6A is an example of the data layered signal 104 and control message 106 where the data layered is performed using CDM/TDM. The transmission 600 includes a control portion 602 such as a physical downlink control channel (PDCCH) and a data portion 604 such as physical downlink shared channel (PDSCH). The data portion 604 includes the MBB data 606 and the MTC data 608 where the MTC data 608 is overlaid on the MBB data using CDM.

FIG. 6B block diagram of the data layered signal 610 using CDM where the MTC data is overlaid on the MBB data using frequency division multiplexing (FDM). Accordingly, the transmission of FIG. 6B is an example of the data layered signal 104 and control message 106 where the data layered is performed using CDM/FDM.

Therefore, the MTC data symbols are either CDM/TDM or CDM/FDM overlaid on the MBB data symbols which is part of a larger resource allocation for the MBB data transmission. Generally, the MTC transmissions have a relatively very small amount of data with a relatively large control signaling overhead. Sharing the control resources between the two devices allows the MTC data transmissions to have much lower controlling overhead by sharing the control signal used for the associated MBB data. The same PDCCH carrying the DL control information (DCI) is decoded by both the devices for obtaining the scheduling assignments. For the example, an additional field is added in the DCI to indicate to the devices that a portion of the MBB data has CDM transmissions.

Figure 7:
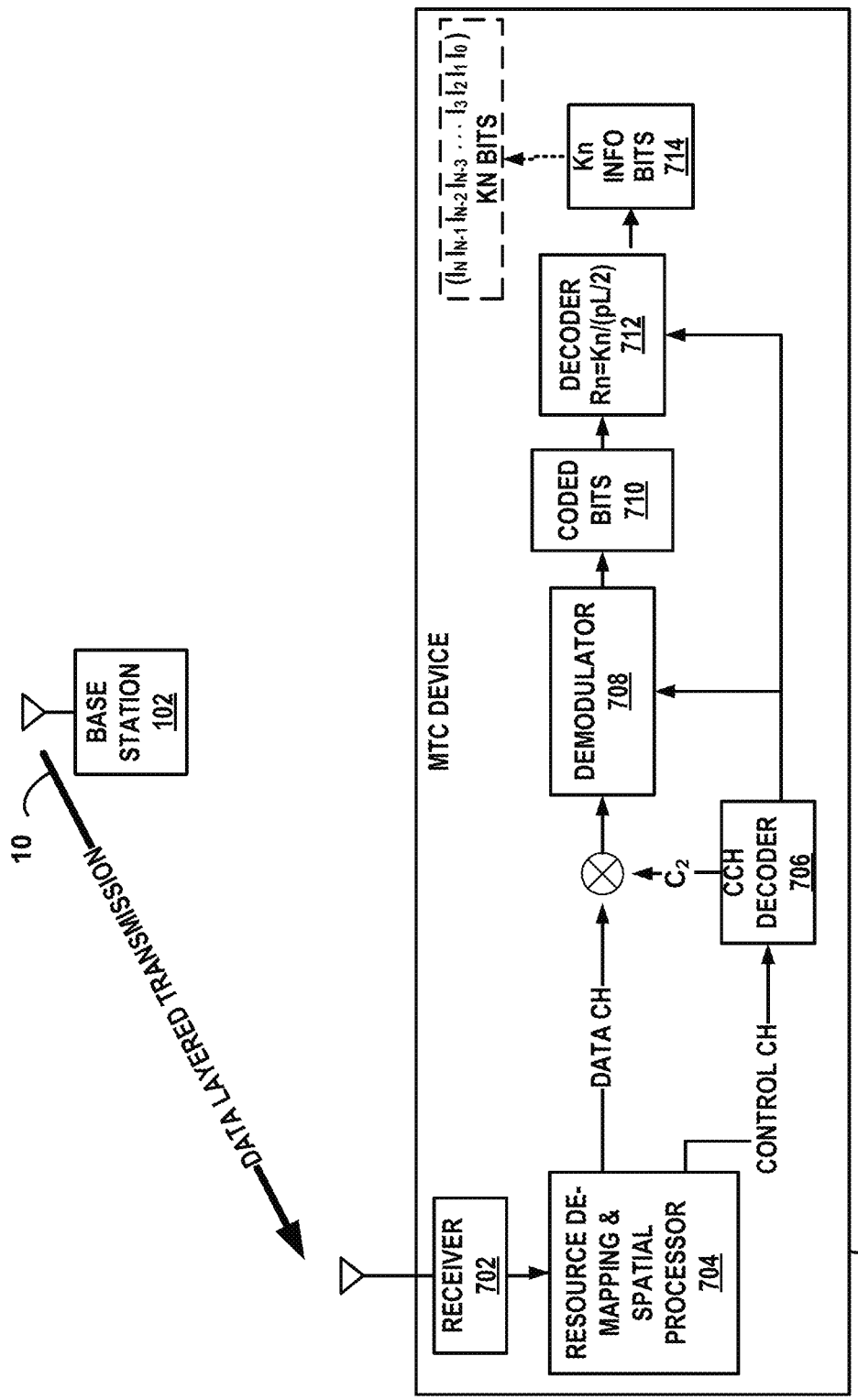
FIG. 7 is a block diagram of a UE device for an example where the layered data signal is a layered using CDM.

FIG. 7 is a block diagram of a UE device 700 for an example where the layered data signal is a layered using CDM. For the example of FIG. 7, only a single CDM code is used to de-scramble or de-spread the demodulated signal. As a result, FIG. 7 is an example of the second UE device 110 for the implementation shown in FIG. 5. The techniques discussed may be applied to other UE devices may more than one CDM code is used such as the first device. The various functions and operations of the blocks described with reference to the UE device 700 may be implemented in any number of devices, circuits, electronics, code, or elements. Two or more of the functional blocks may be integrated in a single device, and the functions described as performed in any single block may be implemented over several devices. For example, the functions of the receiver 502, the demodulator 706 as well as other spatial processing and de-mapping functions 704 may be performed by a single receiver apparatus in some circumstances.

The receiver 702 receives the data layered signal 104 from the base station 102 (200). A resource de-mapping and spatial processor 304 performs MIMO and spatial parameters to de-map and spatially process the signal as discussed above. The control channel information including the control message 106 is decoded by a control channel decoder 706 and the data channel portion of the signal is de-spread and then demodulated by the demodulator 708. The same PDCCH carrying the DL control information (DCI) is decoded by both the devices for obtaining the scheduling assignments.

In some circumstances, the CDM code ($C_2$) is configured based on hashing of the identification (ID) of the MTC device to one of 32 or 64 CDM codes. For example, where the MTC ID is known to the base station 102, the MTC device can apply its ID to determine which of the CDM codes is being used for the MTC data. Therefore, as an alternative, to the CCH decoder 706 determining the CDM code ($C_2$) from the control information, the CDM code can be selected based on the MTC ID.

The control channel decoder 706 determines the contents of the control message 106 regarding modulation order and the data layering parameters located within the data layering information fields associated with and assigned to the UE device 700. The data layering control information fields include the CDM code ($C_2$) for de-spreading the incoming signal. The demodulator 708 applies the modulation order parameters determined by the control channel decoder to generate the sequence of coded bits 710 that includes the coded bits 512. In accordance with the control information retrieved by the control channel decoder 706, the decoder 712 recovers the MTC data directed to the UE device 700.

Figure 8:
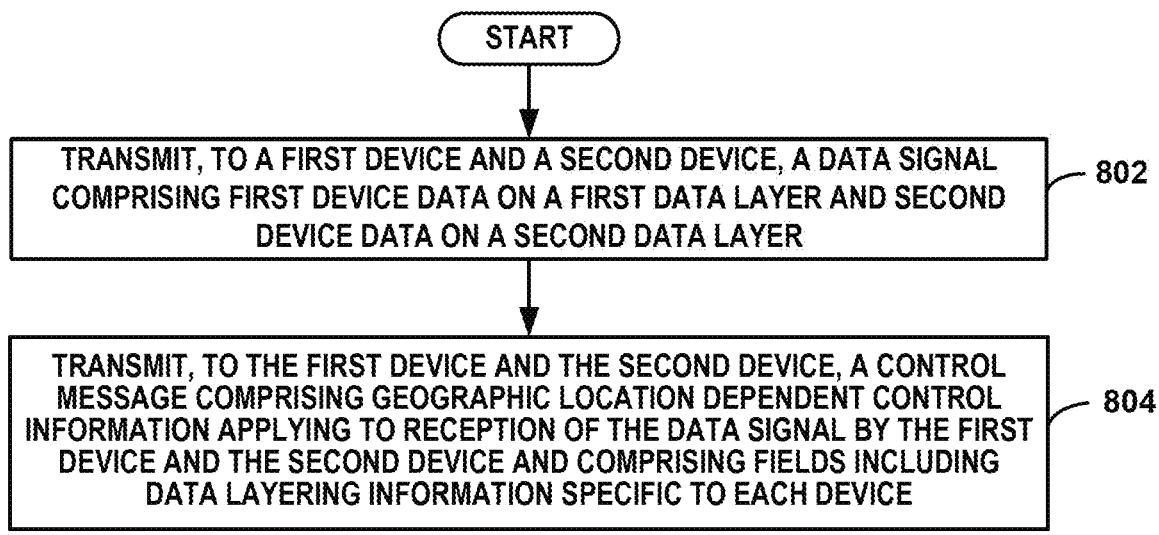
FIG. 8 is a flow chart of an example of a method of transmitting a layered data transmission to multiple devices that are in close proximity to each other.

FIG. 8 is a flow chart of an example of a method of transmitting a layered data transmission 10 to multiple devices that are in close proximity to each other. The steps of FIG. 8 can be performed in a different order than shown and some steps may be combined into a single step. Additional steps may be performed and some steps may be omitted. For the example, the method is performed by the base station 102.

At step 802, the base station transmits a layered data signal 104 to a first device and to second device where the two devices are close to each other. As discussed above, the devices are close enough to each other such that control information dependent on location such a spatial vectors and MIMO parameters are at least similar and may be the same. For the example, the layered data signal includes first device data directed to a first device and second device data directed to a second device.

At step 804, a control message is transmitted to the first device and the second device. The control message comprises geographical location dependent control information that is common to both devices. The control message also includes device specific data layering information that is specific to each device and included in data layering information fields within the control message. Each device receiving the control message and layered data signal, applies the common control information and the device specific data layering control information to recover the data that is directed to that device.

Figure 9:
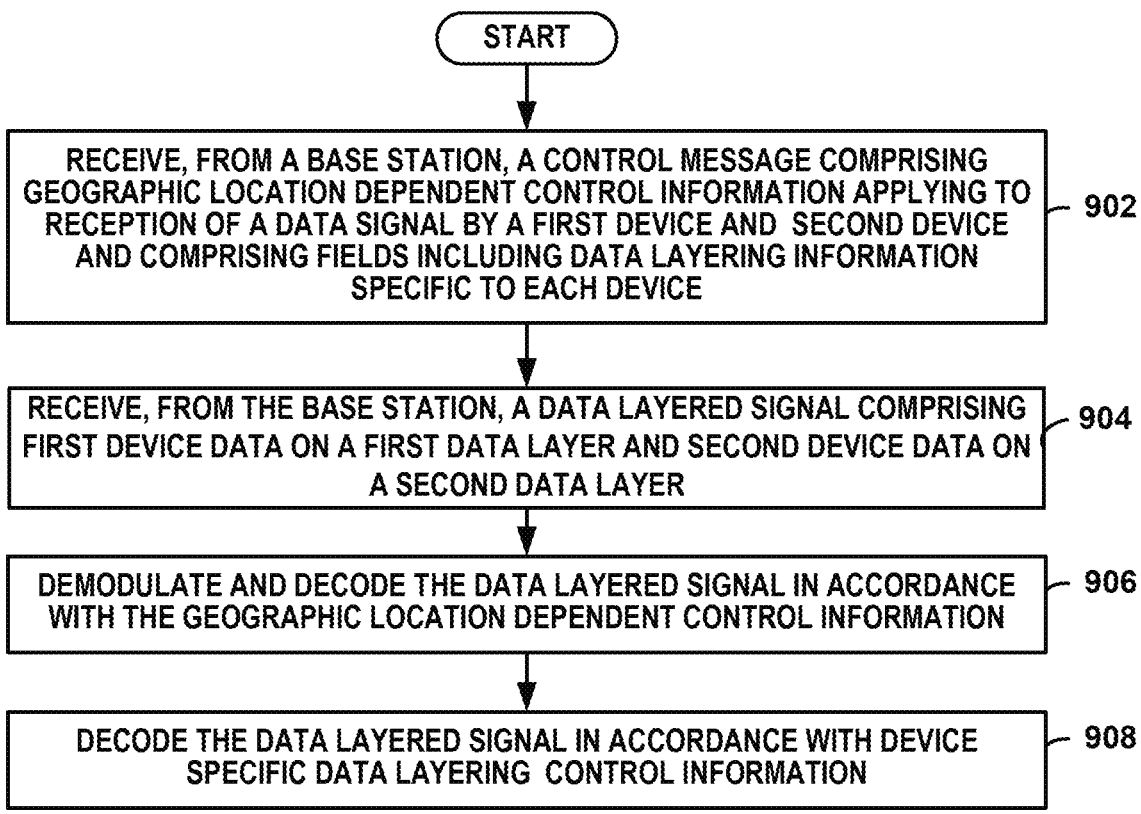
FIG. 9 is a flow chart of a method of receiving a layered data transmission at a UE device.

FIG. 9 is a flow chart of a method of receiving a layered data transmission 10 at a UE device. The steps of FIG. 9 can be performed in a different order than shown and some steps may be combined into a single step. Additional steps may be performed and some steps may be omitted. For the example, the method is performed by a UE device such as the first UE device 108 or the second UE device 110.

At step 902, a control message is received from the base station where the control message comprises geographic location dependent control information which applies to reception of a data signal by a first device and reception by a second device. The control message includes fields including device specific data layering information specific to each device.

At step 904, a data layered signal is received from the base station. The data layered signal comprises the first device data on a first data layer and the second device data on a second data layer.

At step 906, the data layered signal is demodulated and decoded in accordance with the geographic location dependent control information. The UE device applies the common location dependent control information to demodulate and decode the data layered signal.

At step 908, the data layered signal decoded in accordance with the device specific data layering control information. The device applies the device dependent data layering control information to recover the data directed to the device.

Therefore, a target user equipment (UE) device receives a layered data transmission comprising a data layered signal and a control message. The data layered signal comprises target data directed to the target UE device and other data directed to another UE device. The control message comprises geographic location dependent control information applying to reception of the data signal by the target UE device and that applies to the other UE device. The data layer control information is arranged within device specific data layering control information fields that include at least one data layering control information field directed to the target UE device and at least one data layering control information field directed to the other UE device. The target UE device demodulates the data layered signal in accordance with the geographic location dependent control information and recovers the target data from the data layered signal in accordance with the device specific data layering control information in the at least one data layering control information field directed to the target UE device.

Therefore, the various techniques discussed above provide an efficient mechanism for conveying data and control information to multiple devices positioned at a common location. Control information includes common control information that applies to multiple devices because of the proximity of the devices to each other. In some techniques, common data time-frequency communication resources are shared between devices by layering data. Further, feedback from fewer than all of the devices can be used to set transmission, spatial, modulation, coding rate, and timing parameters for the transmission received by multiple devices where the transmission conveys different data to each device. For example, timing alignment for all collocated devices can be determined from feedback from only a single device of the group. Other considerations for opportunities for increasing efficiency and performance for the techniques discussed above include mobility mechanisms where the collocated devices receiving the transmission all handover to the same target cell together. When in IDLE mode, the collocated devices may be required to select the same cell for camping so that connection establishment and pages is applicable for all the collocated devices at the same time.

Clearly, other embodiments and modifications of this invention will occur readily to those of ordinary skill in the art in view of these teachings. The above description is illustrative and not restrictive. This invention is to be limited only by the following claims, which include all such embodiments and modifications when viewed in conjunction with the above specification and accompanying drawings. The scope of the invention should, therefore, be determined not with reference to the above description, but instead should be determined with reference to the appended claims along with their full scope of equivalents.

The invention claimed is:

1. A method comprising:
   transmitting a same transmission signal to a user equipment (UE) device and a machine type communication (MTC) device, the same transmission signal comprising:
   a plurality of data subcarriers conveying UE data for the UE device, at least a portion of the data subcarriers conveying at least some of the UE data on a UE data layer and conveying MTC data for the MTC device on a MTC data layer; and
   a plurality of control subcarriers conveying geographic location dependent control information applying to reception of the data subcarriers by the UE device and by the MTC device.

2. The method of claim 1, wherein the control carriers further convey data layer control information comprising:
   UE data layer control information applying to recovery of the UE data from the UE data layer; and
   MTC data layer control information applying to recovery of the MTC data from the MTC data layer.

3. The method of claim 2, wherein the data layer control information is arranged in a UE field and MTC field, with the UE data layer control information in the UE field and the MTC data layer control information in the MTC field.

4. The method of claim 3, wherein the transmitting the transmission signal comprising transmitting the transmission signal in accordance with at least one revision of The Third Generation Partnership Project (3GPP) Long Term Evolution (LTE) specification and wherein the control subcarriers provide a Physical Downlink Control Channel (PDCCH) for conveying the geographic location dependent control information and the data layer control information.

5. The method of claim 4, wherein the PDCCH includes a downlink control information (DCI) field including an indication that MTC data is included on the least some of the subcarriers including UE data.

6. The method of claim 2, wherein:
   the MTC data layer control information comprises a layered data indicator indicating that the MTC data is overlaid on a portion of data subcarriers conveying UE data; and
   the MTC data is within a predetermined format known to the MTC device, the predetermined format comprising:
   a modulation coding scheme (MCS);
   a size of the MTC data; and
   a time-frequency resources of the MTC data overlaid on the portion of data subcarriers.

7. The method of claim 6, wherein the predetermined format further comprises common spatial resources of the UE data and the MTC data.

8. The method of claim 2, wherein the geographic location dependent control information comprises multiple input multiple output (MIMO) parameters.

9. The method of claim 2, wherein the data layer control information comprises a UE modulation order for the UE data layer and a MTC modulation order for the MTC data layer.

10. The method of claim 9, further comprising:
    encoding information bits of UE data with a first coding rate to generate first encoded bits; and
    encoding information bits of the MTC data with a second coding rate to generate second encoded bits, the first encoded bits and the second encoded bits modulated by the modulator, wherein the data layer control information comprises the first encoding rate and the second encoding rate.

11. The method of claim 10, further comprising:
    arranging the first encoded bits and the second encoded in a sequence of bits such that, when the sequence of bits is modulated, a plurality of modulation symbols are generated, each modulation symbol having a set of least significant bits (LSBs) and a set of most significant bits (MSBs), and the first encoded bits are represented by one of the sets of LSBs and MSBs and the second encoded bits are represented by another set of the sets of LSBs and MSBs.

12. The method of claim 2, wherein:
    the UE data layer control information identifies whether the LSBs or the MSBs are representing UE data; and
    the MTC data layer control information identifies whether the LSBs or the MSBs are representing the MTC data.

13. The method of claim 2, wherein:
    the UE data layer control information identifies time-frequency resources conveying the UE data; and
    the MTC data layer control information identifies time-frequency resources conveying the MTC data.

14. A base station comprising:
    a transmitter configured to transmit, a same transmission signal to a user equipment (UE) device and a machine type communication (MTC) device, the same transmission signal comprising:
    a plurality of data subcarriers conveying UE data for the UE device, at least a portion of the data subcarriers conveying at least some of the UE data on a UE data layer and conveying MTC data for the MTC device on a MTC data layer; and
    a plurality of control subcarriers conveying geographic location dependent control information applying to reception of the data subcarriers by the UE device and by the MTC device, the plurality of control subcarriers conveying data layer control information comprising:
    UE data layer control information applying to recovery of the UE data from the UE data layer; and
    MTC data layer control information applying to recovery of the MTC data from the MTC data layer.

15. The base station of claim 14, wherein the geographic location dependent control information comprises multiple input multiple output (MIMO) parameters.

16. The base station of claim 15, wherein the transmitter is configured to transmit the transmission signal in accordance with at least one revision of The Third Generation Partnership Project (3GPP) Long Term Evolution (LTE) specification and wherein the control subcarriers provide a Physical Downlink Control Channel (PDCCH) for conveying the geographic location dependent control information and the data layer control information.

17. The base station of claim 14, wherein the data layer control information comprises a UE modulation order for the UE data layer and a MTC modulation order for the MTC data layer.

* * * * *